US009568675B2

(12) United States Patent
Chu et al.

(10) Patent No.: US 9,568,675 B2
(45) Date of Patent: Feb. 14, 2017

(54) WAVEGUIDE COUPLER (71) Applicant: City University of Hong Kong, Kowloon (HK)

(72) Inventors: Sai Tak Chu, Kowloon (HK); Peng Zhou, Kowloon (HK); Jacky Ping Yuen Tsui, Kowloon (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 14/297,717

(22) Filed: Jun. 6, 2014

(65) Prior Publication Data
US 2015/0008993 A1 Jan. 8, 2015

Related U.S. Application Data (60) Provisional application No. 61/842,433, filed on Jul. 3, 2013.

(51) Int. Cl.
*H01P 1/163* (2006.01)
*G02B 6/122* (2006.01)
*H01P 5/08* (2006.01)
*H01P 5/02* (2006.01)
*G02B 6/12* (2006.01)

(52) U.S. Cl.
CPC .......... *G02B 6/1228* (2013.01); *H01P 5/082* (2013.01); *G02B 2006/12147* (2013.01)

(58) Field of Classification Search
CPC ............ H01P 5/082; H01P 5/02; H01Q 15/08
USPC ....... 333/24 R, 34, 248, 254, 21 R; 343/785, 343/771
See application file for complete search history.

(56) References Cited

U.S. PATENT DOCUMENTS

| | | | | |
|---|---|---|---|---|
| 2,207,845 A | * | 7/1940 | Wolff | H01P 5/103 333/254 |
| 2,207,945 A | * | 7/1940 | Robinson | B65C 3/105 156/564 |
| 2,626,605 A | * | 1/1953 | Booth | A61M 3/0237 604/140 |
| 2,775,760 A | * | 12/1956 | Brown | H01Q 19/134 264/248 |
| 2,802,994 A | * | 8/1957 | Ober | H01P 1/061 333/256 |
| 3,046,506 A | * | 7/1962 | Barnes | H01P 1/32 333/24 R |
| 3,054,075 A | * | 9/1962 | Lohoar | H01P 1/19 332/163 |
| 3,058,073 A | * | 10/1962 | Eldredge | H01P 1/08 333/260 |

(Continued)

OTHER PUBLICATIONS

Schlosser et al., Partially Filled Waveguides and Surface Waveguides of Rectangular Cross Section, 1996, vol. 1, 319, 320 and 373-387.*

*Primary Examiner* — Dean Takaoka
(74) *Attorney, Agent, or Firm* — Renner Kenner Greive Bobak Taylor & Weber (57) ABSTRACT

A waveguide coupler comprising: a first coupling portion arranged to couple with a first waveguide and a second coupling portion arranged to couple with a second waveguide so as to connect the first waveguide and the second waveguide together; wherein arranged between the first and second coupling portions is a wave modulation portion arranged to modulate wave signals transferred between the first waveguide and the second waveguide.

9 Claims, 6 Drawing Sheets

(56) References Cited

U.S. PATENT DOCUMENTS

| | | | | |
|---|---|---|---|---|
| 3,145,356 | A * | 8/1964 | Clarricoats | H01P 5/024 333/24 R |
| 3,188,582 | A * | 6/1965 | Bowness | H03C 7/022 333/254 |
| 3,411,112 | A * | 11/1968 | Honig | H01P 1/218 333/239 |
| 3,594,663 | A * | 7/1971 | Allen | H01P 5/12 333/1 |
| 3,605,101 | A * | 9/1971 | Kolettis | H01Q 13/025 343/783 |
| 4,463,329 | A * | 7/1984 | Suzuki | H01P 3/16 264/127 |
| 4,498,061 | A * | 2/1985 | Morz | H01P 1/172 333/21 A |
| 4,525,693 | A * | 6/1985 | Suzuki | H01P 3/16 156/184 |
| 4,673,947 | A * | 6/1987 | Newham | H01Q 19/193 343/781 CA |
| 4,761,049 | A | 8/1988 | Burns et al. | |
| 4,973,924 | A | 11/1990 | Bergero et al. | |
| 5,185,828 | A | 2/1993 | van der Tol | |
| 5,227,744 | A * | 7/1993 | Sabatier | H01P 5/103 333/21 R |
| 5,369,367 | A | 11/1994 | Eisenhart | |
| 5,399,999 | A | 3/1995 | Eisenhart | |
| 5,642,121 | A * | 6/1997 | Martek | H01Q 13/24 343/783 |
| 5,684,495 | A * | 11/1997 | Dyott | H01Q 19/09 333/21 R |
| 5,867,073 | A | 2/1999 | Weinreb et al. | |
| 5,872,494 | A * | 2/1999 | Palan | G01F 23/284 333/252 |
| 5,877,663 | A * | 3/1999 | Palan | G01F 23/284 333/252 |
| 6,834,546 | B2 * | 12/2004 | Edvardsson | G01F 23/284 340/612 |
| 7,009,408 | B2 * | 3/2006 | Maier | G01F 23/284 324/642 |
| 7,787,715 | B2 | 8/2010 | Kumatoriya | |
| 7,889,149 | B2 * | 2/2011 | Diaz | H01Q 13/24 333/21 A |
| 2008/0186113 | A1 | 8/2008 | Hoover | |
| 2015/0008990 | A1 * | 1/2015 | Chu | G02B 6/102 333/239 |

* cited by examiner

WAVEGUIDE COUPLER

TECHNICAL FIELD

The present invention relates to a waveguide coupler and particularly, although not exclusively, to a broadband sub-millimeter wave dielectric waveguide coupler arranged to couple a metallic waveguide with a dielectric waveguide.

BACKGROUND

Waveguides are widely used in different technology fields such as wireless and wire-line communications, metrology, sensing and security for guiding waves from one point to another. Generally, waveguides can be broadly classified as metallic waveguides and dielectric waveguides. These different waveguides have very different fundamental characteristics and wave guiding properties.

As the terahertz (THz) frequency range is located between the microwaves and optics regimes, emerging THz waveguide applications will naturally employ convergence of techniques from both of these regimes. Whilst the transition between optics and microwaves for most applications only require simple scaling, guided-wave applications between optics and microwaves often require the use of both metallic waveguides and dielectric waveguides that have drastically different wave guiding properties for transferring wave signals or power. Efficient wave signals or power transfer and coupling between these waveguides are critical to both the operation and the characterization of THz guided-wave systems.

SUMMARY OF THE INVENTION

In accordance with a first aspect of the present invention, there is provided a waveguide coupler comprising: a first coupling portion arranged to couple with a first waveguide and a second coupling portion arranged to couple with a second waveguide so as to connect the first waveguide and the second waveguide together; wherein arranged between the first and second coupling portions is a wave modulation portion arranged to modulate wave signals transferred between the first waveguide and the second waveguide.

In one embodiment of the first aspect, the wave modulation portion is operable to modulate a power of the wave transferred between the first waveguide and the second waveguide.

In one embodiment of the first aspect, the first waveguide is a dielectric waveguide or a metallic waveguide; and the second waveguide is another one of a dielectric waveguide or a metallic waveguide.

In one embodiment of the first aspect, the waveguide coupler is made of dielectric materials.

In one embodiment of the first aspect, the waveguide coupler is made of plastic or thermoplastic material.

In one embodiment of the first aspect, the plastic or thermoplastic material comprises polypropylene.

In one embodiment of the first aspect, the waveguide coupler is made by injection molding in a single mold or in multiple molds.

In one embodiment of the first aspect, the first waveguide comprises a first shape or structure; and the second waveguide comprises a second shape or structure.

In one embodiment of the first aspect, the first coupling portion comprises a tapered structure arranged to be inserted into the first waveguide with the first shape for transferring wave signals between the first waveguide and the wave modulation portion of the waveguide coupler.

In one embodiment of the first aspect, the second coupling portion comprises a structure with the second shape for transferring wave signals between the wave modulation portion of the waveguide coupler and the second waveguide.

In one embodiment of the first aspect, the wave modulating portion comprises a curved tapered structure transiting between the tapered structure of the first coupling portion and the structure with the second shape of the second coupling portion.

In one embodiment of the first aspect, the wave modulating portion comprises a mode shaper arranged to modulate a first mode field received from the first waveguide to a second mode field adapted for the second waveguide; or to modulate the second mode field received from the second waveguide to the first mode field adapted for the first waveguide.

In one embodiment of the first aspect, the waveguide coupler further comprises a waveguide portion arranged between the first portion and the wave modulation portion.

In one embodiment of the first aspect, the waveguide coupler is adapted for sub-millimeter wave and terahertz frequency range applications.

In accordance with a second aspect of the present invention, there is provided a waveguide comprising at least one of the waveguide coupler in accordance with the first aspect of the present invention.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1A:
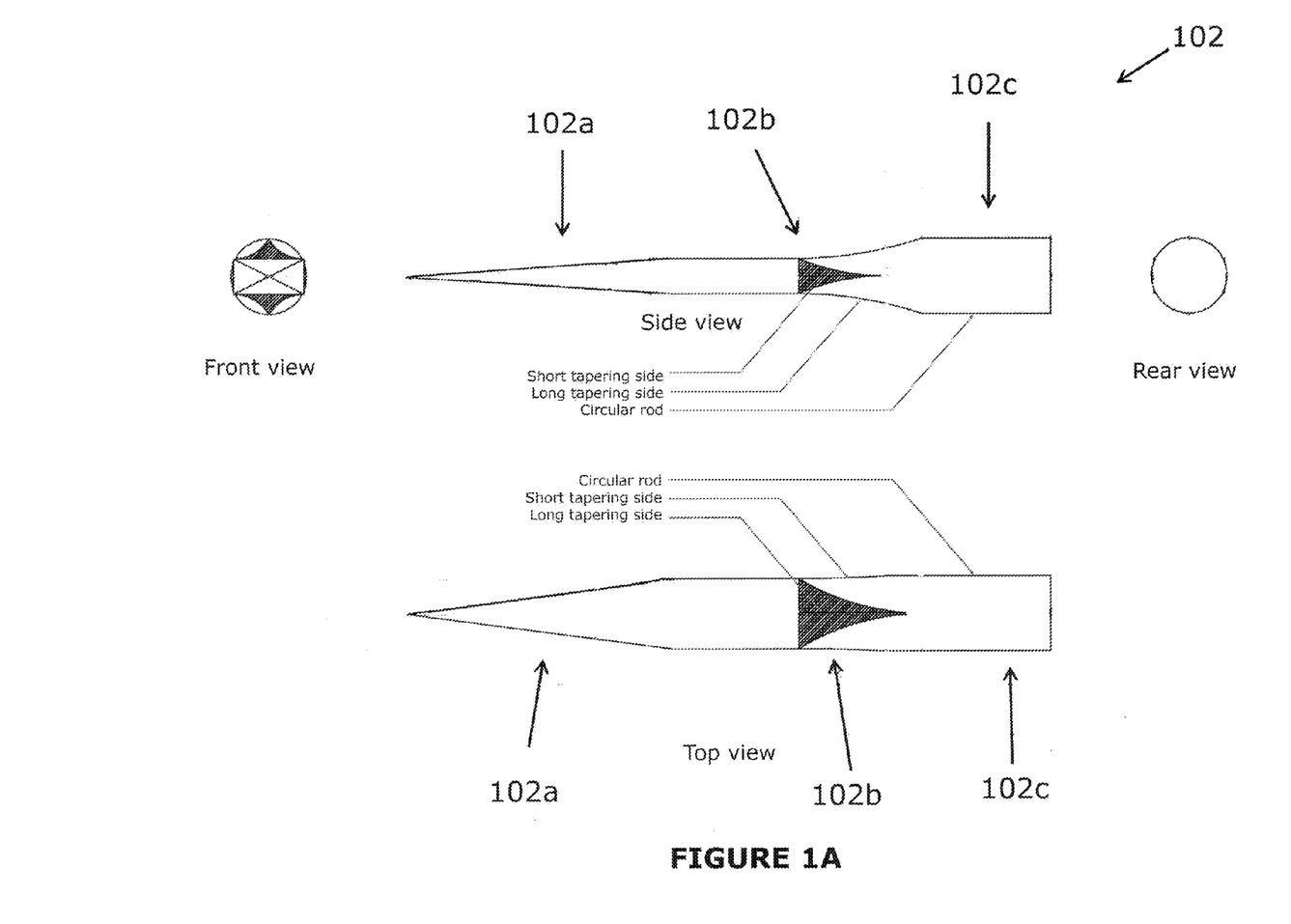
FIG. 1A shows different views of a waveguide coupler for sub-millimeter and terahertz frequency applications in accordance with one embodiment of the present invention.
Figure 1B:
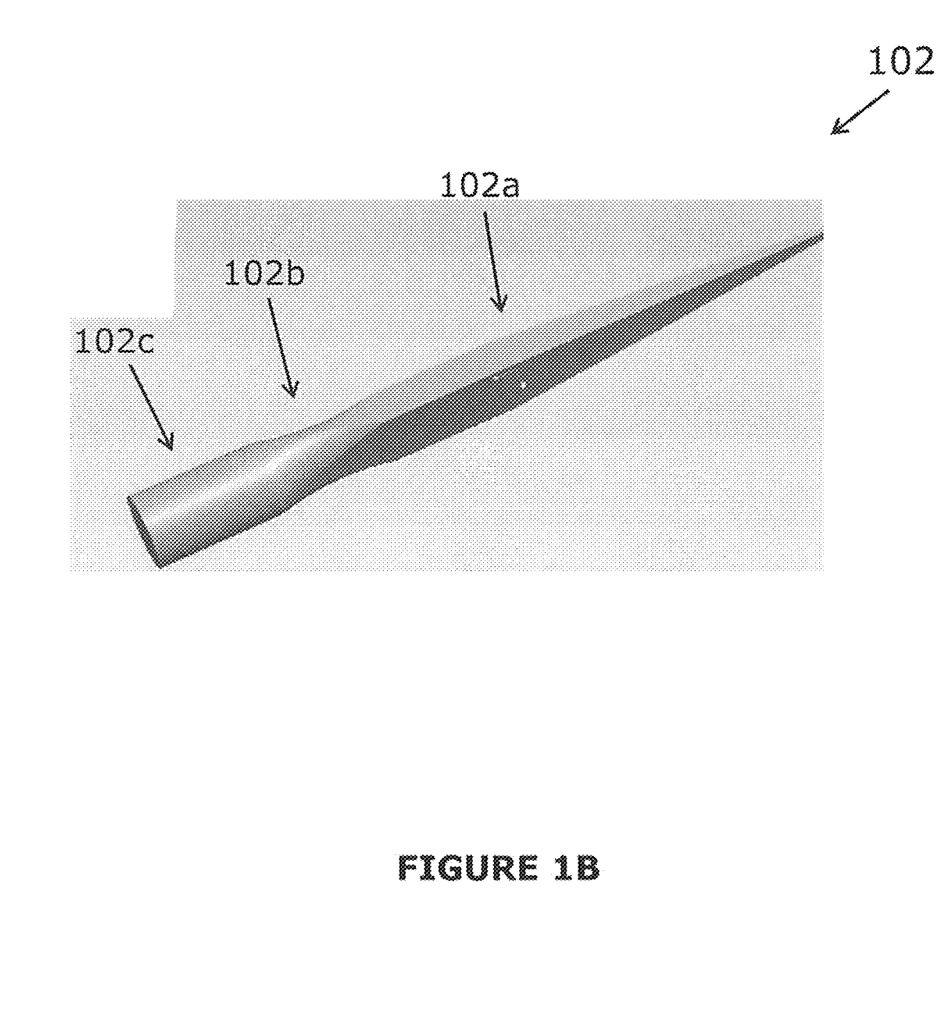
FIG. 1B shows the waveguide coupler of FIG. 1A.
Figure 2:
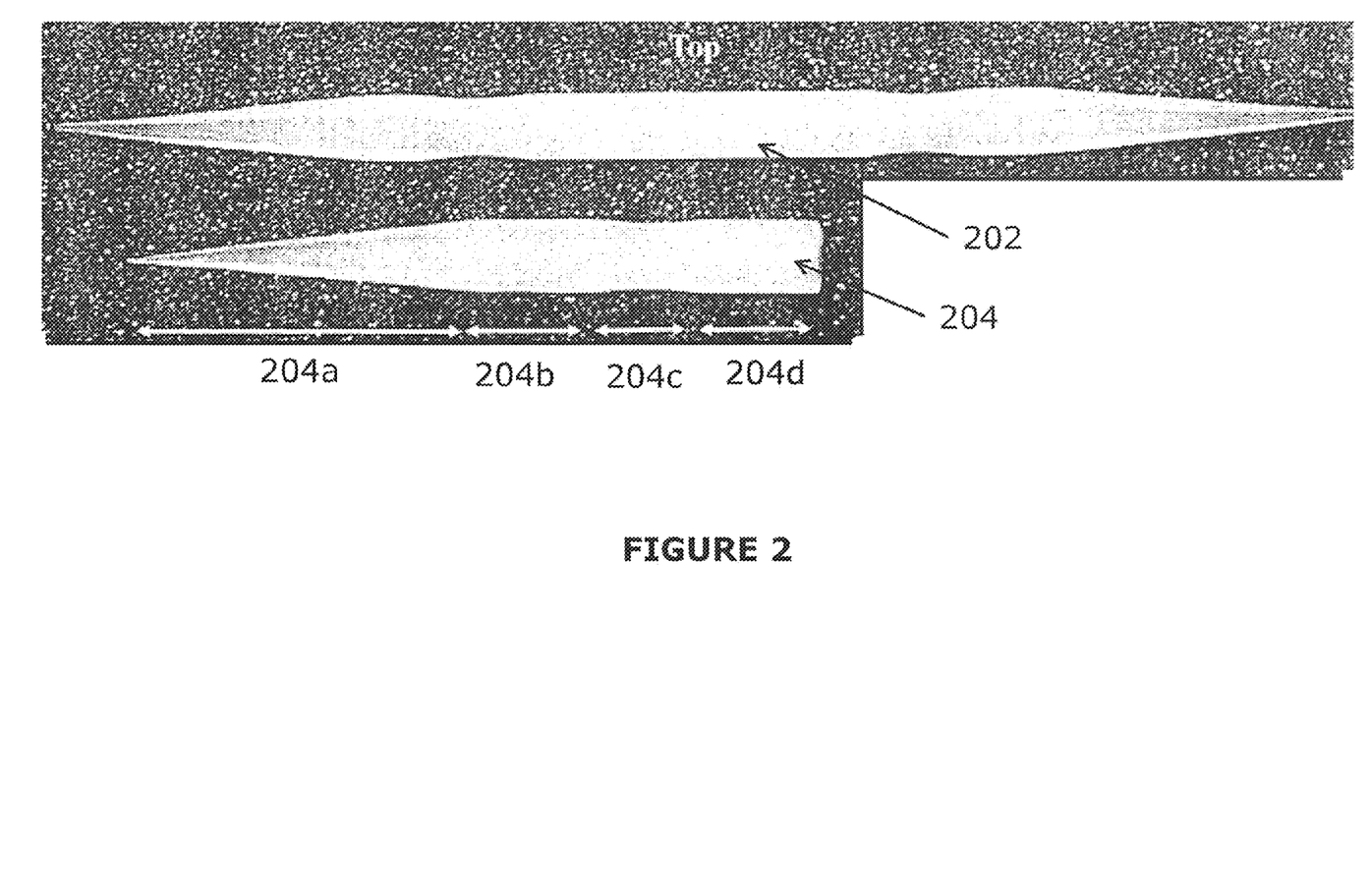
FIG. 2 shows the structures of two waveguide couplers fabricated with dielectric (thermoplastic) materials in accordance with one embodiment of the present invention.

Referring to FIGS. 1A to 2, there is shown a waveguide coupler comprising: a first coupling portion arranged to couple with a first waveguide and a second coupling portion arranged to couple with a second waveguide so as to connect the first waveguide and the second waveguide together; wherein arranged between the first and second coupling portions is a wave modulation portion arranged to modulate wave signals transferred between the first waveguide and the second waveguide. Preferably, the wave modulation portion is operable to modulate a power of the wave transferred between the first waveguide and the second waveguide.

FIGS. 1A and 1B show different views of a waveguide coupler 102 for sub-millimeter wave and terahertz frequency applications in accordance with one embodiment of the present invention. The waveguide coupler 102 as shown in FIGS. 1A and 1B is arranged to be connected between a metallic waveguide and a dielectric waveguide, and hence to couple a metallic waveguide with a dielectric waveguide. In one example of the present embodiment, the waveguide coupler 102 is arranged to couple signals from or to a vector network analyzer's (PNA-X) rectangular-metallic I/O ports to or from a dielectric rod-waveguide (not shown). In one embodiment, the rectangular (metallic) waveguide I/O ports of the PNA-X operating at 140 GHz to 220 GHz is expanded from the standard WR-05 (1.3 mm×0.65 mm) to the enlarged WR-22 (5.6 mm×2.8 mm) via commercially available metallic taper mode convertors (not shown) to ease fabrication tolerance of the dielectric coupler 102. Preferably, a FDTD solver package is used in the design and optimization of the waveguide coupler 102. In other embodiments, the waveguide coupler 102 is adapted to couple different metallic and dielectric waveguides regardless of the form or shape of both of the waveguides.

The waveguide coupler 102 as shown in FIGS. 1A and 1B is preferably made with material with low dielectric constant. This material may be for example, dielectric material such as plastics or thermoplastics. In the present embodiment, the waveguide coupler 102 is made of polypropylene (PP). A refractive index measurement of polypropylene by THz-TDS shows that polypropylene has a low refractive index of around 1.49 with very low absorption loss in the sub-mm/THz frequency band and thus polypropylene is well-suited for sub-mm/THz frequency applications. In other embodiments, other plastic, thermoplastic or polymeric materials can also be used to manufacture the waveguide coupler 102. Preferably, the dielectric waveguide coupler 102 is fabricated using injection molding methods. The waveguide coupler 102 may be fabricated using a single mold or multiple molds depending on the complexity of the structure and design.

In a preferred embodiment, the dielectric waveguide coupler 102 as shown in FIGS. 1A and 1B comprises three portions. The first portion 102a is a tapered rectangular structure that serves as a probe for connecting with a metallic waveguide (not shown) for adiabatic power transfer between the metallic waveguide and the waveguide coupler 102. In one example of the present embodiment, the first portion 102a of the waveguide coupler transfers wave signals and power from the WR-22 metallic waveguide to a second portion 102b of the waveguide coupler. The first portion 102a preferably includes a tapered sharp end and a non-tapered flat end continuous into the second portion 102b. Optionally, the dimensions of the first portion 102a at the non-tapered flat end may correspond to that of the metallic waveguide connected thereto (e.g. WR-22 in this example).

As shown in FIGS. 1A and 1B, the sharp end of the first portion 102a of the waveguide coupler is linearly tapered to a point in both the x and y facets. However, in some embodiments, the first portion 102a in the form of a probe may have any form of tapered shape or even have no tapered shape at all. Preferably, the first portion 102a when inserted inside the metallic waveguide provides a smooth wave signals or power transition between the metallic waveguide and the second portion 102b of the waveguide coupler 102.

The second portion 102b of the waveguide coupler 102 is arranged and connected between the first portion 102a and a third portion 102c of the waveguide coupler 102. The second portion 102b is arranged to modulate wave signals or power transferred between the metallic waveguide and the dielectric waveguide. In this example, the second portion 102b of the dielectric waveguide coupler 102 includes an enlarged diameter of 6 mm, although in other embodiments other sizes and shapes are possible. Preferably, the tapered structure of the second portion 102b is realized by a curved taper function in the both width and height directions. This is realized in this example, by the TE11 mode of the rectangular first portion 102a that is slowly transferred into the HE11 mode of the third portion 102c along the two cross-sectional curvatures of the second portion 102b, as shown in FIGS. 1A and 1B.

The third portion 102c of the waveguide coupler 102 is arranged between the second portion 102b and a dielectric waveguide for transferring wave signals or power between the second portion 102b of the waveguide coupler 102 and the dielectric waveguide. In this embodiment, the third portion 102c includes a substantially rod shaped structure adapted to be coupled with the dielectric waveguide with similar shape and structure for wave signals or power transfer.

Although in this embodiment the waveguide coupler 102 is arranged to connect with metallic and dielectric waveguides of specific structures, it should be noted that the waveguide coupler 102 of the present invention may be arranged to couple metallic and dielectric waveguides of different shape, structure and form. In other words, the waveguide coupler 102 may have other optimized design for different applications.

To study the wave signals and power modulating/coupling properties of the proposed waveguide coupler of the present invention, two waveguide couplers were fabricated with dielectric thermoplastic (PP) material and were tested with an Agilent PNA-X network analyzer. FIG. 2 shows the structures of two fabricated thermoplastic dielectric couplers 202, 204 in accordance with one embodiment of the present invention.

As shown in FIG. 2, the fabricated waveguide coupler 204 comprises four portions: a linear tapered probe portion 204a arranged to be inserted into the metallic waveguide that smoothly transfer wave signals or power form the metallic waveguide to the initial dielectric waveguide portion, in this case a rectangular dielectric waveguide coupler portion; an initial dielectric waveguide portion 204b; a wave modulation portion 204c with a mode shaper arranged for converting the mode shape/field of the initial dielectric waveguide portion 204b to the mode shape/field for a circular dielectric waveguide coupler portion 204d, i.e. in this case an elliptical mode shape of the rectangular dielectric waveguide coupler portion to a circular mode shape of the circular dielectric waveguide coupler portion; and a circular dielectric waveguide coupler portion 204d arranged to be coupled with an dielectric waveguide. In a preferred embodiment, the power modulation portion 204c is arranged to convert any mode shape received from the metallic waveguide connected at one end of the coupler to another mode shape adapted for the dielectric waveguide connected at the other end of the coupler, or to convert any mode shape received from the dielectric waveguide connected at one end of the coupler to another mode shape adapted for the metallic waveguide connected at the other end of the coupler. In some embodiments, the dielectric waveguide coupler 204 may include additional sections or may have less than four sections. Preferably, the different sections of the dielectric coupler 204 are integrally formed.

An alternative waveguide coupler 202 with two of the waveguide couplers 204 connected back to back is also shown in FIG. 2. This structure is preferably coupled between two metallic waveguides so as to provide a metallic waveguide—dielectric waveguide coupler—metallic waveguide arrangement for measurement purposes.

Figure 3:
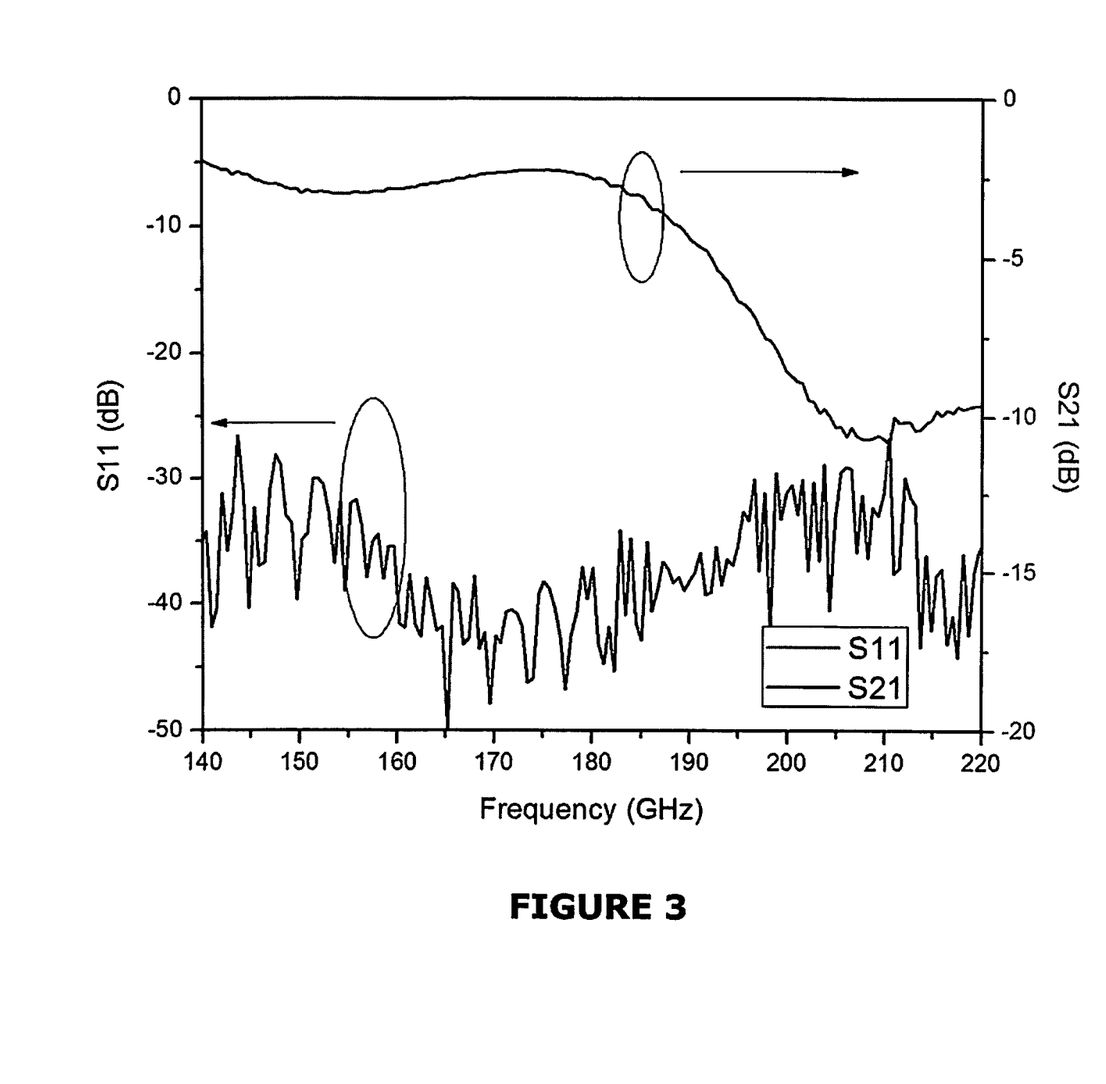
FIG. 3 is a plot showing the simulated transition and return losses of the end-to-end transition of two dielectric waveguide couplers of FIG. 2 placed back-to-back between two WR-22 metallic waveguides over the frequency band of 140-220 GHz.

FIG. 3 shows a plot of the simulation results of the transmission (S21) and reflection (s11) losses of the end-to-end transition for the two dielectric couplers 204 of FIG. 2 placed back-to-back between two WR-22 metallic waveguides over the frequency band of 140-220 GHz. As shown in FIG. 3, per transmission loss of approximate 1 dB at frequency between 140 GHz and 190 GHz is obtained but the loss gradually increases at higher frequencies. In the results, the higher loss at higher frequency may be due to the unwanted coupling to higher order modes in the overmoulded dielectric rod. Preferably, the loss can be reduced by increasing the taper length or by reducing the size of the rod shaped structure.

Figure 4:
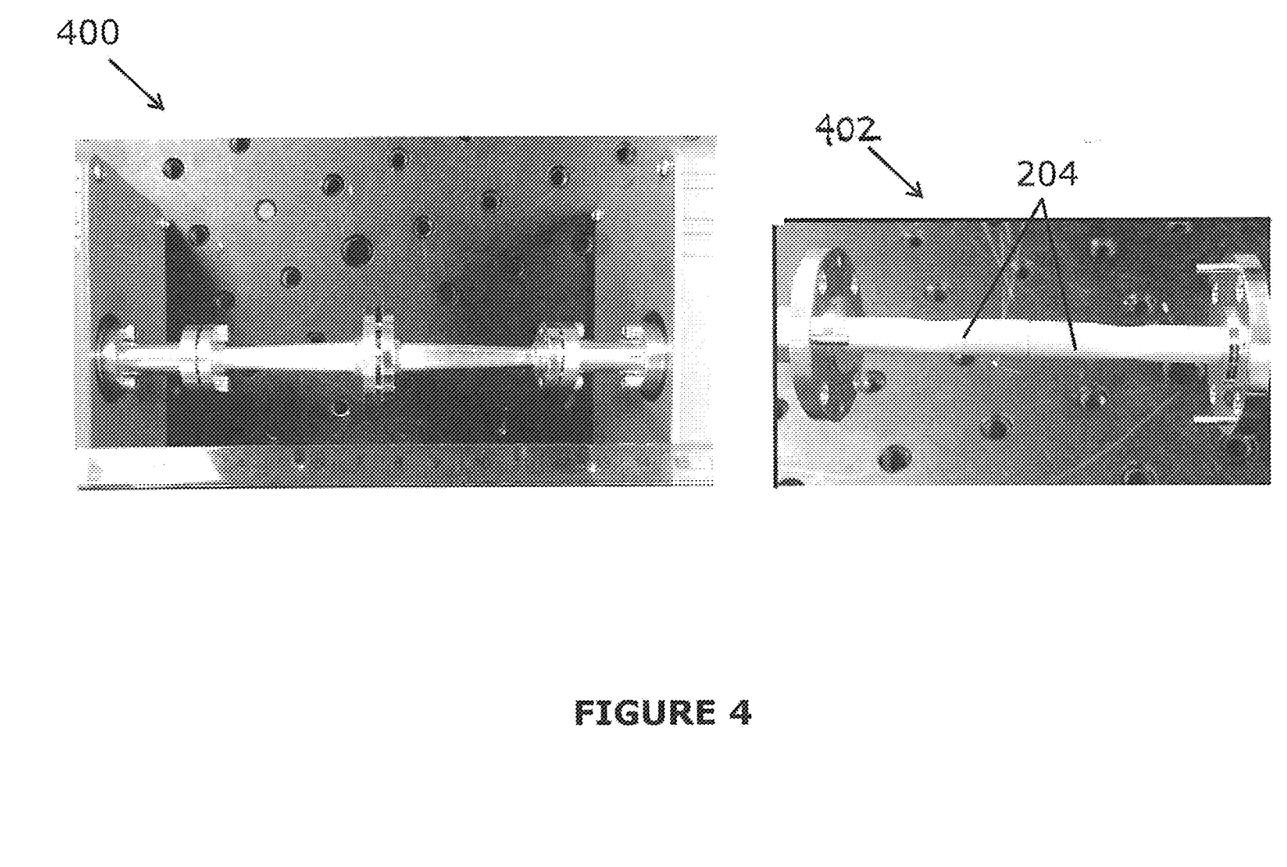
FIG. 4 shows the metallic mode convertors and a measurement setup with two dielectric waveguide couplers of FIG. 2 placed back-to-back in accordance with one embodiment of the present invention.

FIG. 4 shows the metallic mode convertors 400 and a measurement setup 402 with two dielectric couplers 204 of FIG. 2 placed back-to-back in accordance with one embodiment of the present invention. Total transmitted (S21) and reflected (S11) power of the two dielectric couplers 204 placed back-to-back are measured using the measurement setup 402 with an Agilent PNA-X network analyzer and the metallic mode convertors 400.

Figure 5:
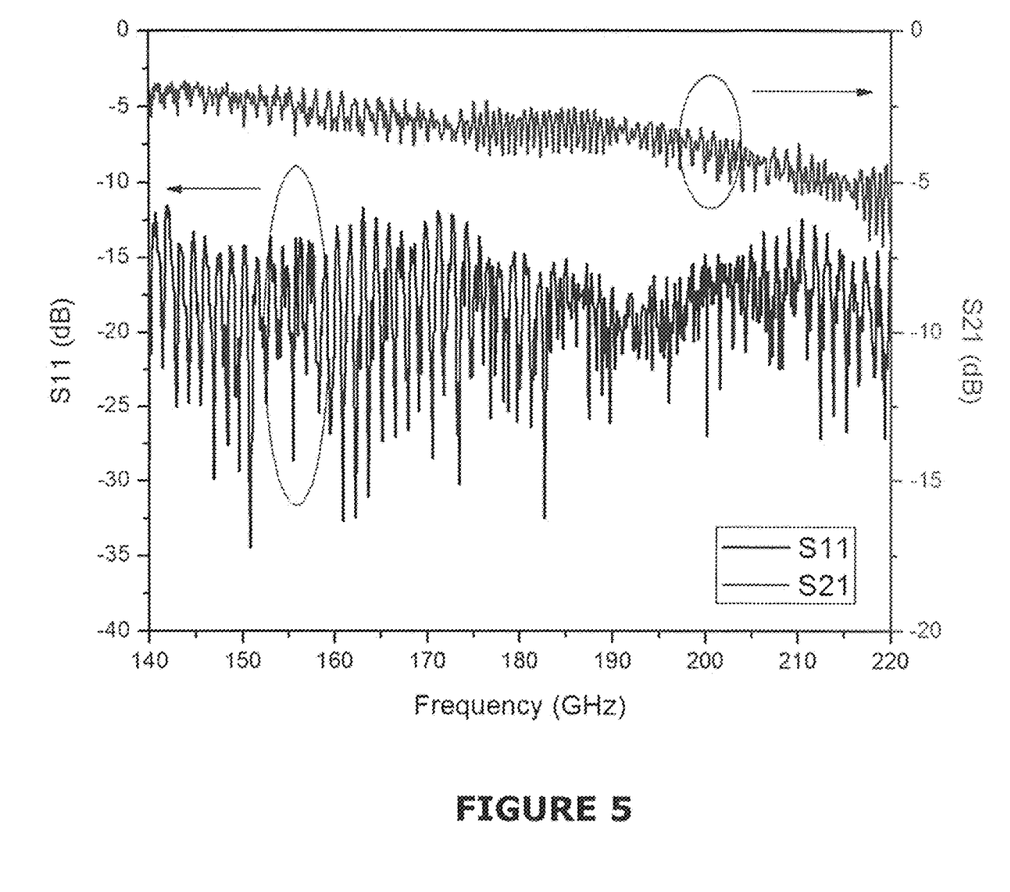
FIG. 5 is a plot showing the total transmitted (S21) and reflected (S11) power losses of the two dielectric waveguide couplers of FIG. 2 placed back-to-back measured by the measurement setup of FIG. 4.

FIG. 5 is a plot showing the total transmitted (S21) and reflected (S11) power losses of the two dielectric couplers 204 of FIG. 2 placed back-to-back measured by the measurement setup 402 of FIG. 4. As shown in FIG. 5, the total end-to-end insertion loss stays below 5 dB for the entire band. In particular, at the lower frequency band (say below 190 GHz), the loss can be kept below 2.5 dB. The total loss can be kept below 3 dB at frequency less than 190 GHz where the effects of higher order mode coupling is less significant, as predicted by the simulation. From the low return (reflected power) loss value of below 15 dB over the full band, it can be determined that smooth power transition between the various sections in the waveguide coupler 204 is obtained. These results show that the waveguide coupler 204 in one embodiment of the present invention is operable to deliver power efficiently from the metallic waveguide (e.g. rectangular in this embodiment) of the network analyzer to the dielectric waveguide (e.g. rod like in this embodiment). Even lower return loss level can be achieved by eliminating the interface between the two waveguide couplers 204.

The above embodiments provide a dielectric coupler that allows low loss wave signals or power transfer/modulation between metallic and dielectric waveguides. The dielectric waveguides, such as polymer fibers, is one of the ideal transmission media for sub-millimeter signal. However, most sub-millimeter/terahertz apparatus has a metallic waveguide front end. The present invention provides a dielectric coupler that can be easily fabricated with thermoplastic materials using injection molding method. The dielectric coupler is arranged to transfer wave signals or power from a metallic waveguide to a dielectric waveguide or vice versa. The dielectric waveguide coupler in the present invention comprises three major portions: a tapered probe at one end to be inserted into the metallic waveguide to efficiently convert power between the metallic waveguide and the waveguide coupler; a wave modulating portion with a mode shaper for modulating the wave signals or power transferred between the metallic waveguide and the dielectric waveguide by converting the mode shape/field of the metallic waveguide to the mode shape/field of the dielectric waveguide; and a coupling portion arranged to be inserted into or coupled with the dielectric waveguide to transfer wave signals or power between the dielectric coupler and the dielectric waveguide.

The present invention is particularly advantageous in that by using low dielectric constant material as the coupler material, the size constraint imposed onto the metallic waveguide based components are reduced. By using dielectrics such as thermoplastics, the waveguide dimension can be increased by approximately an order of magnitude compared with the metallic waveguide components. With the size increase and the materials selection in accordance with the present invention, manufacturing processes for mass production such as injection molding can be applied to produce these components. Moreover, the present invention enables the transfer of wave signals or power between metallic waveguides, which is the preferred platform in sub-millimeter wave/THz apparatus, and the dielectric circular waveguide, which is the preferred transmission platform for transmission in photonics. The structures presented in the above embodiments can serve as a versatile and low-cost platform for other sub-mm/THz sensing, imaging and other applications. Other advantages of the present invention will become apparent with reference to the description above.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A dielectric waveguide coupler comprising:
   (a) a first coupling portion arranged to be connected at one end with a metallic waveguide;
   (b) a second coupling portion arranged to be connected at one end with a dielectric waveguide; and
   (c) a wave modulation portion connecting the first and second coupling portions, the wave modulation portion being arranged to modulate power of a sub-millimeter wave signal transferred between the metallic waveguide and the dielectric waveguide;
   (d) wherein the wave modulating portion comprises a mode shaper arranged to:
   modulate a first mode field of the sub-millimeter wave signal received from the first coupling portion to a second mode field of the sub-millimeter wave signal adapted for the dielectric waveguide, or modulate a first mode field of the sub-millimeter wave signal received from the second coupling portion to a second mode field of the sub-millimeter wave signal adapted for the metallic waveguide;
   (e) wherein the dielectric waveguide coupler is made of plastic or thermoplastic material;
   (f) wherein the dielectric waveguide coupler is arranged for sub-millimeter wave and terahertz frequency range applications;
   (g) wherein the metallic waveguide comprises a substantially rectangular cross section and the dielectric waveguide comprises a substantially circular cross section;

(h) wherein the first coupling portion has a substantially rectangular cross section and the second coupling portion has a substantially circular cross section.

2. A dielectric waveguide coupler in accordance with claim 1, wherein the plastic or thermoplastic material comprises polypropylene.

3. A dielectric waveguide coupler in accordance with claim 1, wherein the dielectric waveguide coupler is made by injection molding in a single mold or in multiple molds.

4. A dielectric waveguide coupler in accordance with claim 1, wherein the first coupling portion is tapered and is arranged to be inserted into the metallic waveguide with the substantially rectangular cross section for transferring the sub-millimeter wave signal between the metallic waveguide and the wave modulation portion of the waveguide coupler.

5. A dielectric waveguide coupler in accordance with claim 4, wherein the second coupling portion is substantially not tapered and is arranged for transferring the sub-millimeter wave signal between the wave modulation portion of the dielectric waveguide coupler and the dielectric waveguide.

6. A dielectric waveguide coupler in accordance with claim 5, wherein the wave modulating portion comprises a curved tapered structure transiting between the first coupling portion and the second coupling portion.

7. A dielectric waveguide coupler in accordance with claim 1, further comprising a waveguide portion arranged between the first coupling portion and the wave modulation portion.

8. A waveguide comprising at least one of the dielectric waveguide coupler in accordance with claim 1.

9. A dielectric waveguide coupler in accordance with claim 1, wherein the first mode field is a $TE_{11}$ mode and the second mode field is $HE_{11}$ mode.

* * * * *

UNITED STATES PATENT AND TRADEMARK OFFICE
CERTIFICATE OF CORRECTION

PATENT NO. : 9,568,675 B2
APPLICATION NO. : 14/297717
DATED : February 14, 2017
INVENTOR(S) : Sai Tak Chu, Peng Zhou and Jacky Ping Yuen Tsui Page 1 of 1

It is certified that error appears in the above-identified patent and that said Letters Patent is hereby corrected as shown below:

On the Title Page

The Related U.S. Application Data section, item (60) is amended to read:
Provisional Application No. 61/842,443, filed on June 3, 2013.

Signed and Sealed this
First Day of June, 2021

Drew Hirshfeld
*Performing the Functions and Duties of the
Under Secretary of Commerce for Intellectual Property and
Director of the United States Patent and Trademark Office*